R. STEEL.
Velocipede.
No. 208,861. Patented Oct. 8, 1878.
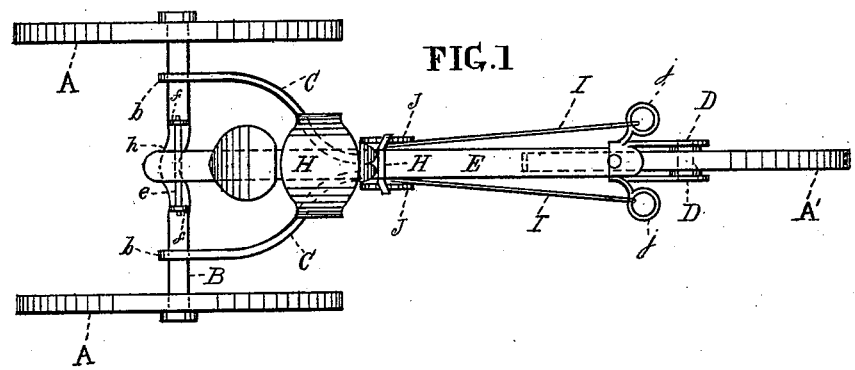
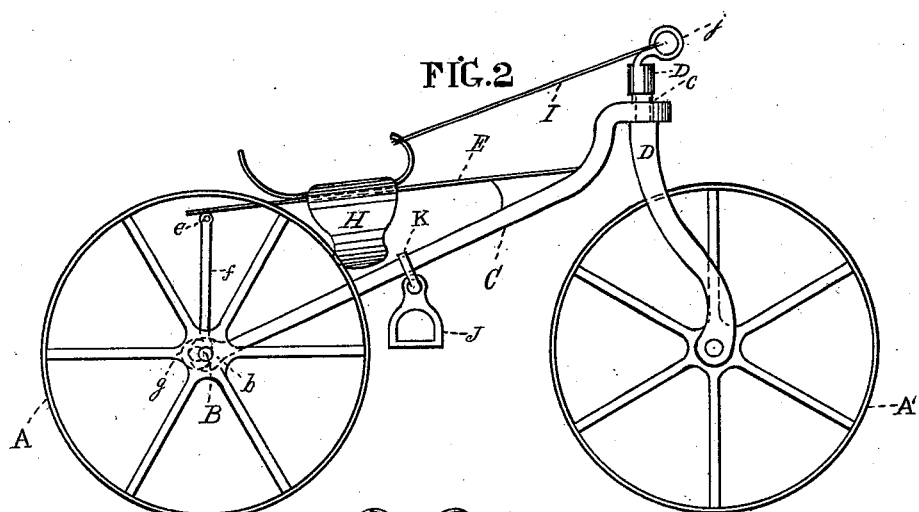
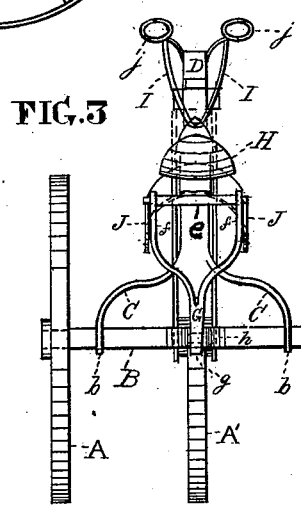
Witnesses
Thomas J. Bewley.
William H. Sparks
Inventor
Robert Steel
per Stephen Ustick Attorney

UNITED STATES PATENT OFFICE.

ROBERT STEEL, OF PHILADELPHIA, PENNSYLVANIA.

IMPROVEMENT IN VELOCIPEDES.

Specification forming part of Letters Patent No. 208,861, dated October 8, 1878; application filed May 18, 1878.

*To all whom it may concern:*

Be it known that I, ROBERT STEEL, of the city and county of Philadelphia, in the State of Pennsylvania, have invented a new and useful Improvement in Velocipedes, which improvement is fully set forth in the following specification.

The nature of my invention consists of a spring-bar, in combination with the supporting-frame of the velocipede, and with the axle with which it has a crank-connection by means of a jointed upright, in such a manner that, by up and down movements of the body of the rider, seated upon a saddle of the spring-bar, with his feet supported by stirrups or other suitable rests, the vehicle is propelled with much ease, the up and down movements of the rider being similar to such movements which are naturally produced in riding a horse.

In the accompanying drawings, Figure 1 is a plan view of my improved velocipede. Fig. 2 is a side elevation of the same. Fig. 3 is a rear elevation.

Like letters of reference in all the figures indicate the same parts.

A A are the rear wheels of my improved velocipede, and A' the front and swivel wheel. B is the axle of the wheels A A. C is the supporting-frame. It is connected with the axle by means of eyes b b, in which the axle revolves. The front end of the frame has an eye, c, with which the upper end of the swivel D is connected. The lower and bifurcated end of the swivel has an axial connection with the wheel A', in the usual manner.

E is a spring-bar, which is permanently connected at its front end with the supporting-frame C. The rear end of the bar has a like connection with the horizontal rod e, the ends of which have their bearings in the prongs f f of the upright G, which is provided with a hook, g, on its lower end, that connects with the crank h of the axle B. The spring-bar E is provided with a saddle, H, for the rider. I is the line, the ends of which are connected with the eyes j j at the upper end of the swivel D. The stirrups J J are suspended from the bar C by means of the strap K. Any other suitable supports for the feet, however, may be used in their place.

The operation is as follows: The rider being seated in the saddle H, with his feet in the stirrups J J, brings the weight of his body to bear upon the spring-bar E when the crank is in its upward position, which presses the connecting upright G downward, so as to produce the like movement in the crank, and thus give a forward movement to the velocipede, and as the crank begins to ascend in its revolution the driver bears his weight upon the stirrups, and thereby relieves the spring-bar of the weight of his body until the crank begins to descend, when the weight of the body is then brought to bear upon it, and so on continuously. The movements of the crank are kept up in the same manner as by the movements of a treadle when it is subjected to the action of a foot, the operation being easily performed, the up and down movements of the body of the rider being like those naturally produced in riding a horse.

If desired, the bar E may be rigid and supported by any suitable spring connected with the upright G.

I claim as my invention—

The spring-bar E, provided with a saddle, H, in combination with the crank-axle B and jointed upright G, or equivalent device, and the supporting-frame C, provided with stirrups or other foot-rests, substantially in the manner and for the purpose set forth.

ROBERT STEEL.

Witnesses:
   THOMAS J. BEWLEY,
   STEPHEN USTICK.